(12) United States Patent
Pascutiu

(10) Patent No.: US 6,761,476 B2
(45) Date of Patent: Jul. 13, 2004

(54) MULTI-AXIS SWIVEL MECHANISM

(75) Inventor: Mihai S. Pascutiu, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 80 days.

(21) Appl. No.: 10/224,730

(22) Filed: Aug. 21, 2002

(65) Prior Publication Data

US 2004/0037086 A1 Feb. 26, 2004

(51) Int. Cl.[7] .............................. B60Q 1/06; F21V 21/30
(52) U.S. Cl. ...................... 362/526; 362/275; 362/419; 362/428
(58) Field of Search ................................. 362/272, 275, 362/287, 419, 428, 523, 526, 528, 529, 530

(56) References Cited

U.S. PATENT DOCUMENTS

| | | | | |
|---|---|---|---|---|
| 4,306,279 A | * | 12/1981 | Cohen ......................... | 362/275 |
| 4,353,110 A | * | 10/1982 | Ellis ........................... | 362/272 |
| 4,574,334 A | | 3/1986 | Igura .......................... | 362/515 |
| 4,769,743 A | * | 9/1988 | Callahan ..................... | 362/428 |
| 5,562,336 A | | 10/1996 | Gotou ......................... | 362/37 |
| 5,580,148 A | | 12/1996 | Liao ............................ | 362/35 |
| 5,633,710 A | | 5/1997 | Kumra et al. ............. | 356/139.08 |
| 5,868,488 A | | 2/1999 | Speak et al. ................ | 362/37 |
| 5,993,033 A | | 11/1999 | Sugimoto et al. .......... | 362/515 |
| 6,220,735 B1 | | 4/2001 | Matubara ..................... | 362/523 |
| 6,623,147 B2 | * | 9/2003 | Hayami et al. ............. | 362/526 |

* cited by examiner

*Primary Examiner*—Alan Cariaso
(74) *Attorney, Agent, or Firm*—Brinks Hofer Gilson & Lione

(57) ABSTRACT

The present invention involves an apparatus for swiveling a headlamp body of a vehicle. The apparatus includes a headlamp bracket configured to receive the headlamp body to rotate the headlamp body. The headlamp bracket has a mounting stem and a first receiving port extending therefrom. An outer bracket has a receiving slot formed thereon. The receiving slot is shaped so as to receive the mounting stem to define a first axis about which the headlamp bracket rotates within the outer bracket. The outer bracket has a second receiving port extending therefrom. The first receiving port is cooperable with a first motor assembly for rotation of the headlamp bracket within the outer bracket. A plurality of sockets is attached to the outer bracket to define a second axis about which the outer bracket and headlamp bracket rotate. The second receiving port is cooperable with a second motor assembly for rotation of the outer bracket and headlamp bracket about the second axis.

35 Claims, 5 Drawing Sheets

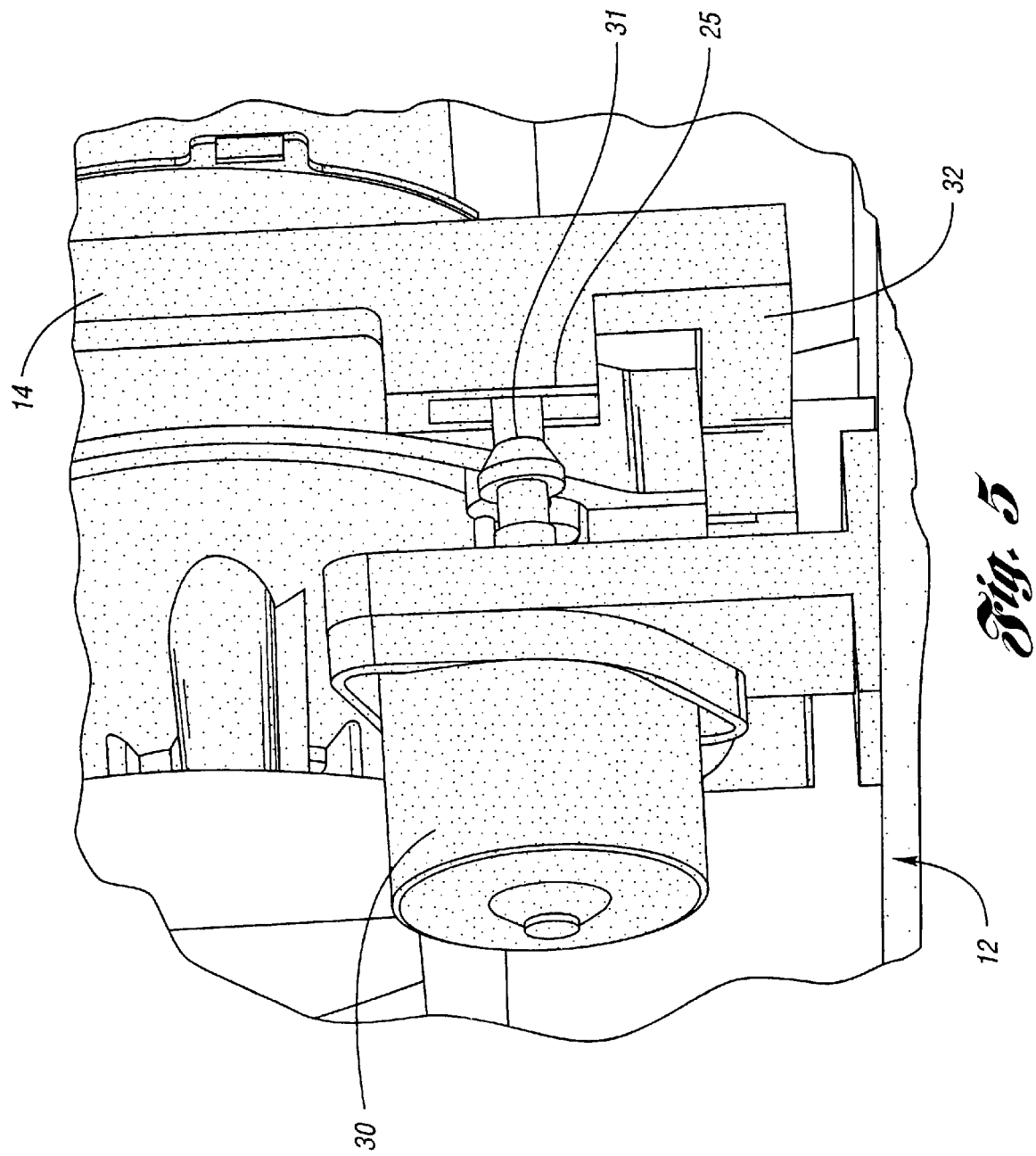

US 6,761,476 B2

MULTI-AXIS SWIVEL MECHANISM

BACKGROUND OF THE INVENTION

The present invention relates generally to an apparatus for swiveling a vehicle headlamp body.

Headlamps in vehicles are common and have been used in many industries including the automotive industry. Drivers of vehicles rely on vehicle headlamps to illuminate a path ahead of the vehicle when ambient light is insufficient.

Although current vehicle headlamps are adequate for this purpose, improvements can be made. For example, a typical vehicle headlamp is configured to be stationary during normal operation of the vehicle. Consequently, when a vehicle turns a corner its headlamps remain stationary or limitedly fixed and aimed in a direction toward which the front of the vehicle faces. At times during night-time driving, some drivers experience difficulty negotiating a turn, since it may be preferred to look beyond the path of illumination in which stationary headlamps are aimed. Moreover, some drivers experience similar difficulties when the vehicle accelerates to greater speeds.

BRIEF SUMMARY OF THE INVENTION

One aspect of the present invention is to provide a means of automatically pivoting vehicle headlamps horizontally to further illuminate the road as the vehicle is turning.

A further aspect of the present invention is to provide a means of automatically pivoting vehicle headlamps vertically to illuminate a path in the direction the vehicle accelerates.

Yet another aspect of the invention is to provide a means of manually pivoting vehicle headlamps horizontally and vertically in order to adjust a stationary alignment of the headlamps.

The above aspects are accomplished through a two-bracket configuration apparatus utilizing four axes of rotation within a headlamp housing. The vehicle headlamp is mounted in a headlamp bracket. The headlamp bracket cooperates with a first motor assembly to produce automatic horizontal rotation about a first axis. An outer bracket cooperates with a second motor assembly to produce automatic vertical rotation about a second axis.

The apparatus is supported by support rods which are attached to the outer bracket and to the housing. By rotating one support rod, manual horizontal rotation about a third axis is provided. By rotating both support rods, manual vertical rotation about a fourth axis is provided.

Other objects and advantages of the present invention will become apparent upon considering the following detailed description and appended claims, and upon reference to the accompanying drawings.

BRIEF DESCRIPTION OF THE DRAWINGS

FIG. 5 is a side close-up view of the apparatus shown in FIG. 1 depicting a second motor assembly engaged with a second receiving port.

DETAILED DESCRIPTION OF THE INVENTION

Figure 1:
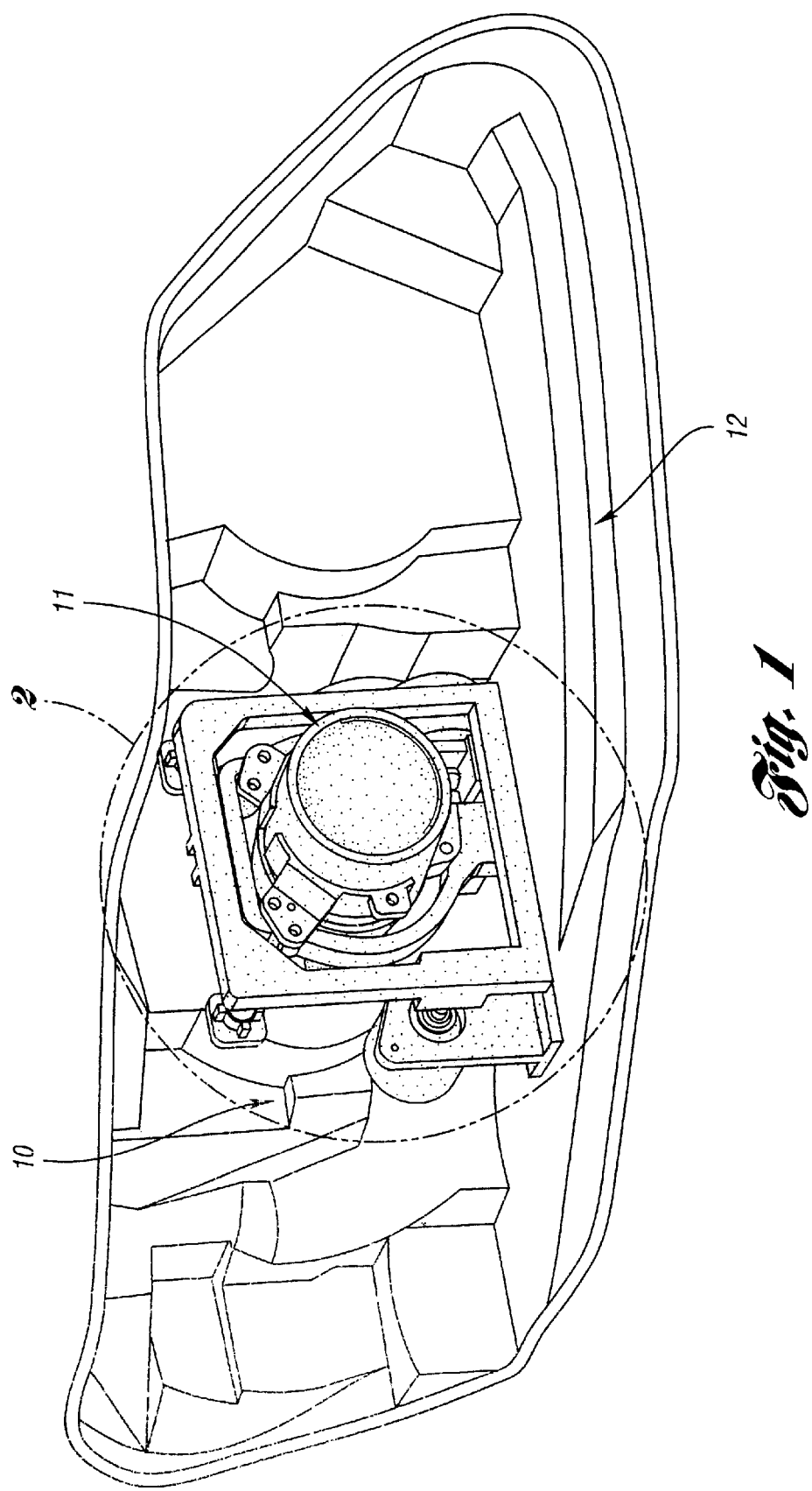
FIG. 1 is a perspective view of an apparatus for swiveling a headlamp body mounted in a housing in accordance with one embodiment of the present invention.

FIG. 1 illustrates an apparatus 10 for swiveling a headlamp body of a vehicle in accordance with one embodiment of the present invention. As shown, a headlamp body 11 is secured to the apparatus 10. The apparatus 10 is shown from its front side as mounted in a vehicle headlamp housing 12 of a vehicle.

Figure 2:
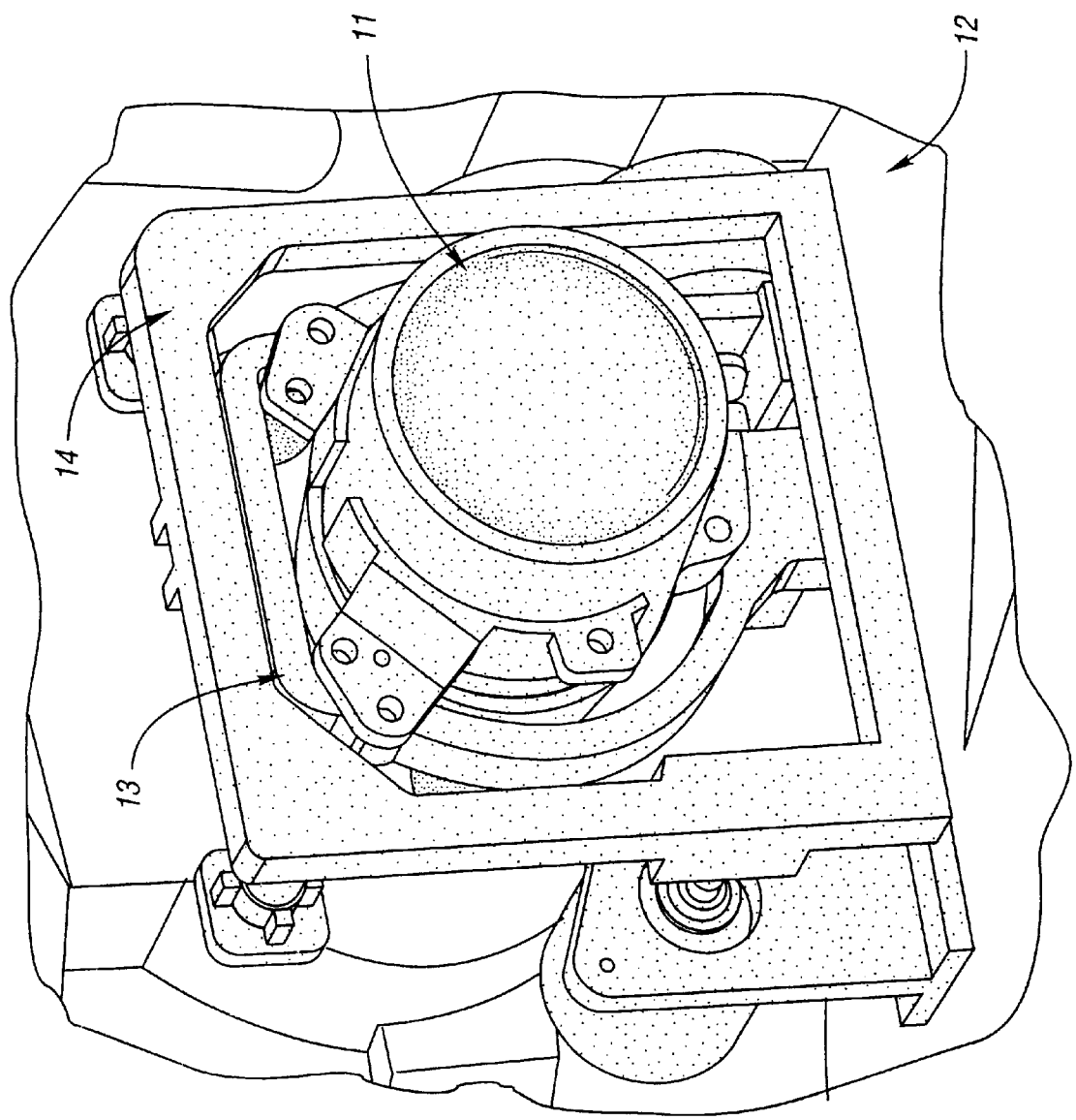
FIG. 2 is an enlarged view of the apparatus shown in circle 2 of FIG. 1.

FIG. 2 illustrates an enlarged view of the apparatus 10 of FIG. 1. A headlamp bracket 13 is configured to receive the headlamp body 11 to rotate the headlamp body 11. The headlamp body 11 may be secured to th e headlamp bracket 13 body suitable means, such as screws or clamps. In this embodiment, the headlamp bracket 13 and headlamp body 11 have threaded apertures through which screws may be disposed to secure the headlamp body 11 to the headlamp bracket 13.

An outer bracket 14 receives the headlamp bracket 13 to cooperate therewith allowing the headlamp body 11 to swivel about a plurality of axes. The housing 12 has walls defining a cavity such that the outer bracket 14 may be disposed within the cavity and mounted to the walls of housing 12. The outer bracket 14 may be mounted to the housing 12 by any suitable means, such as screws, clamps or fasteners. The outer bracket 14 and headlamp bracket 13 are preferably made of a plastic material, such as nylon, high density polyethylene, or any other suitable material.

Figure 3:
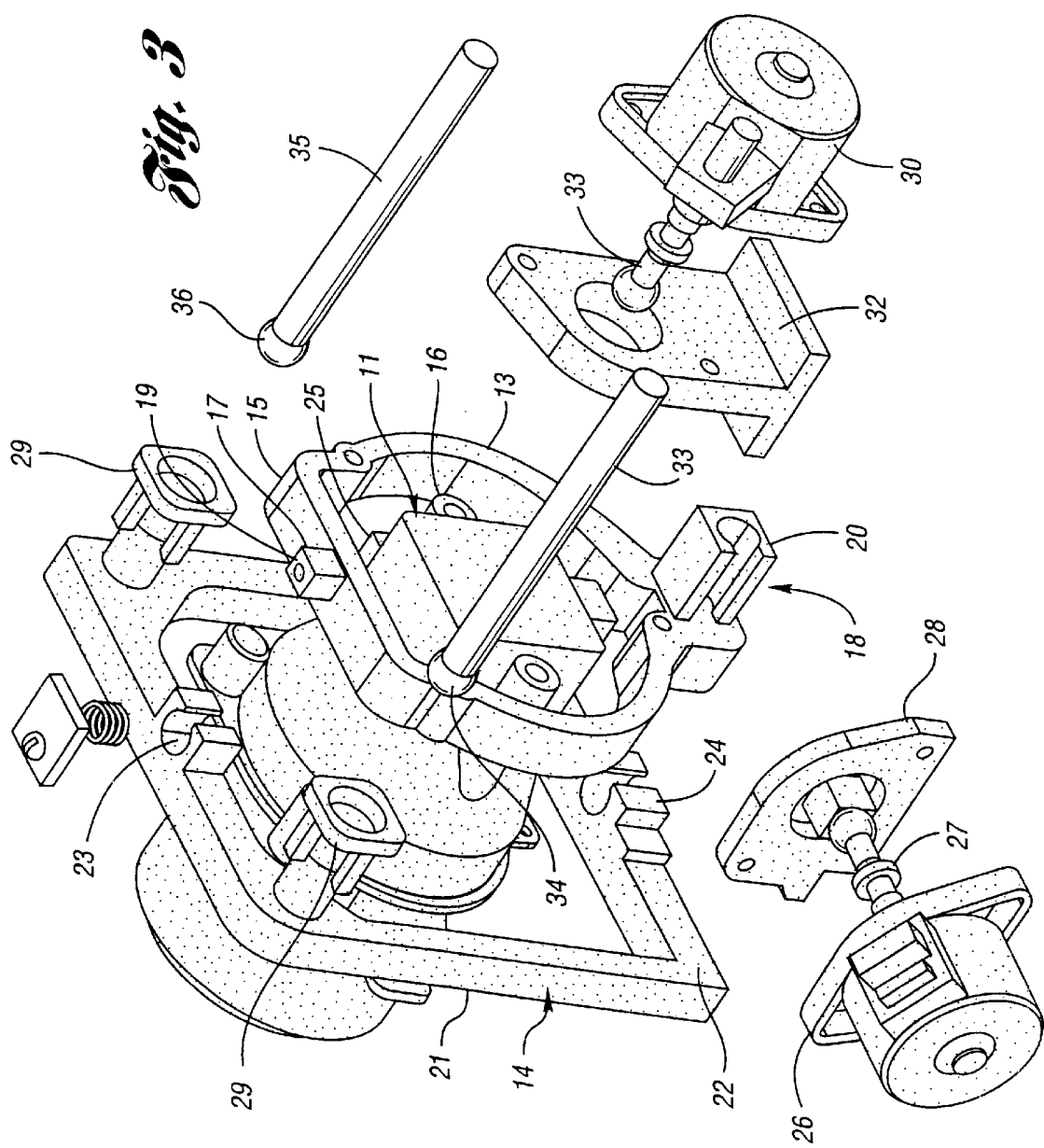
FIG. 3 is an exploded view of the apparatus of FIG. 1 in accordance with one embodiment of the present invention.

FIG. 3 illustrates an exploded view of the apparatus 10. In this embodiment, the headlamp bracket 13 has an outer surface 15 and an inner surface 16. A first mounting stem 17 and second mounting stem 18 extend from the outer surface 15 of the headlamp bracket 13. The headlamp bracket 13 has a first receiving port 20 extending from a back side of the headlamp bracket 13 and is cooperable with the first motor assembly for rotation of the headlamp bracket 13 within the outer bracket 14.

In this embodiment, the outer bracket 14 has a front surface 21 and a back surface 22. A first receiving slot 23 and a second receiving slot 24 are formed on the back surface 22. The first and second receiving slots 23, 24 are shaped so as to receive the first mounting stem 17 and the second mounting stem 18, respectively, and to be cooperable therewith to allow rotation of the headlamp bracket about the first axis. The first mounting stem 17 defines a first axis about which the headlamp bracket 13 pivots within the outer bracket 14. The outer bracket 14 has a second receiving port 25 extending from the back surface 22 and is cooperable with the second motor assembly for rotation of the outer bracket 14 and headlamp bracket 13 about a second axis. In an alternative embodiment the first motor assembly and second motor assembly may comprise one multi-motor assembly which would actuate the automatic horizontal and vertical rotations about the first and second axes, respectively.

In this embodiment, the first motor assembly includes a first motor 26 and a first motor shaft 27. The first motor shaft 27 is actuated by the first motor 26 and slideably engages the first receiving port 20 for rotation of the headlamp bracket 13 about the first axis. A first motor bracket 28 is connected to the back surface 22 for mounting the first motor assembly to the outer bracket 14. The first motor bracket 28 may be mounted to the outer bracket 14 by any suitable means, such as screws, clamps or fasteners. Likewise, the first motor 26 may be mounted to the housing walls by any suitable means, such as screws, clamps or fasteners.

In this embodiment, the first motor bracket 28 and the outer bracket 14 have threaded apertures through which screws may be disposed to secure the first motor bracket 28 to the outer bracket 14. Similarly, the first motor 26 and first motor bracket 28 have threaded apertures through which screws may be disposed to secure the first motor 26 to the walls. The first motor bracket 28 is preferably made of the same material as the outer bracket 14 and headlamp bracket 13.

A plurality of sockets 29 is attached to the outer bracket 14 to define the second axis about which the outer bracket 14 and headlamp bracket 13 rotate. The first mounting stem 17 is received in the first receiving slot 23 so that the headlamp bracket 13 rotates with the outer bracket 14 about the second axis as the second receiving port 25 cooperates with the second motor assembly. The plurality of sockets 29 may be attached to the outer bracket 14 by any suitable means, such as screws, clamps or fasteners. In this embodiment, the plurality of sockets 29 and outer bracket 14 have threaded apertures through which screws may be disposed to secure the plurality of sockets 29 to outer bracket 14. The plurality of sockets 29 is preferably made of a plastic material, such as nylon, high density polyethylene, or any other suitable material.

The second motor assembly includes a second motor 30 and a second motor shaft 31. The second motor shaft 31 is actuated by the second motor 30 and slideably engages the second receiving port 25 for rotation of the outer bracket 14 and the headlamp bracket 13 about the second axis. In this embodiment, a second motor bracket 32 is connected to the housing walls to mount the second motor assembly to the housing 12. The second motor bracket 32 may be mounted to the housing 12 by any suitable means, such as screws, clamps or fasteners. Likewise, the second motor 30 may be mounted to the second motor bracket 32 by any suitable means, such as screws, clamps or fasteners. In this embodiment, the second motor bracket 32 and housing 12 have threaded apertures through which screws may be disposed to secure the second motor bracket 32 to housing 12. Similarly, the second motor 30 and second motor bracket 32 have threaded apertures through which screws may be disposed to secure the second motor 30 to the second motor bracket 32. The second motor bracket 32 is preferably made of the same material as the outer bracket 14 and headlamp bracket 13.

A plurality of support rods includes a first support rod 33 with arcuate end 34 and a second support rod 35 with arcuate end 36. In this embodiment, the arcuate ends 34 and 36 are spherically shaped. Of course, the arcuate ends may take on other suitable shapes without falling beyond the scope or spirit of the present invention. Arcuate ends 34 and 36 are engaged with the plurality of sockets 29 for rotation of the outer bracket 14 and headlamp bracket 13 about the second axis. In this embodiment, arcuate ends 34 and 36 are snap-fitted into the sockets 29. Arcuate ends 34 and 36 may be engaged with the plurality of sockets 29 by any suitable means without falling beyond the scope or spirit of the present invention. The plurality of support rods is preferably made of a metal material, such as aluminum or steel, or any other material of suitable rigidity and stiffness.

In this embodiment, the first support rod 33 and the second support rod 35 are configured with the sockets 29 so as to bear the weight of the apparatus. In use, when the second motor assembly actuates rotation of the outer bracket 14 about the second axis, the headlamp body 11, the headlamp bracket 13, the first motor assembly, and the first motor bracket 28 rotate about the second axis along with outer bracket 14.

Figure 4:
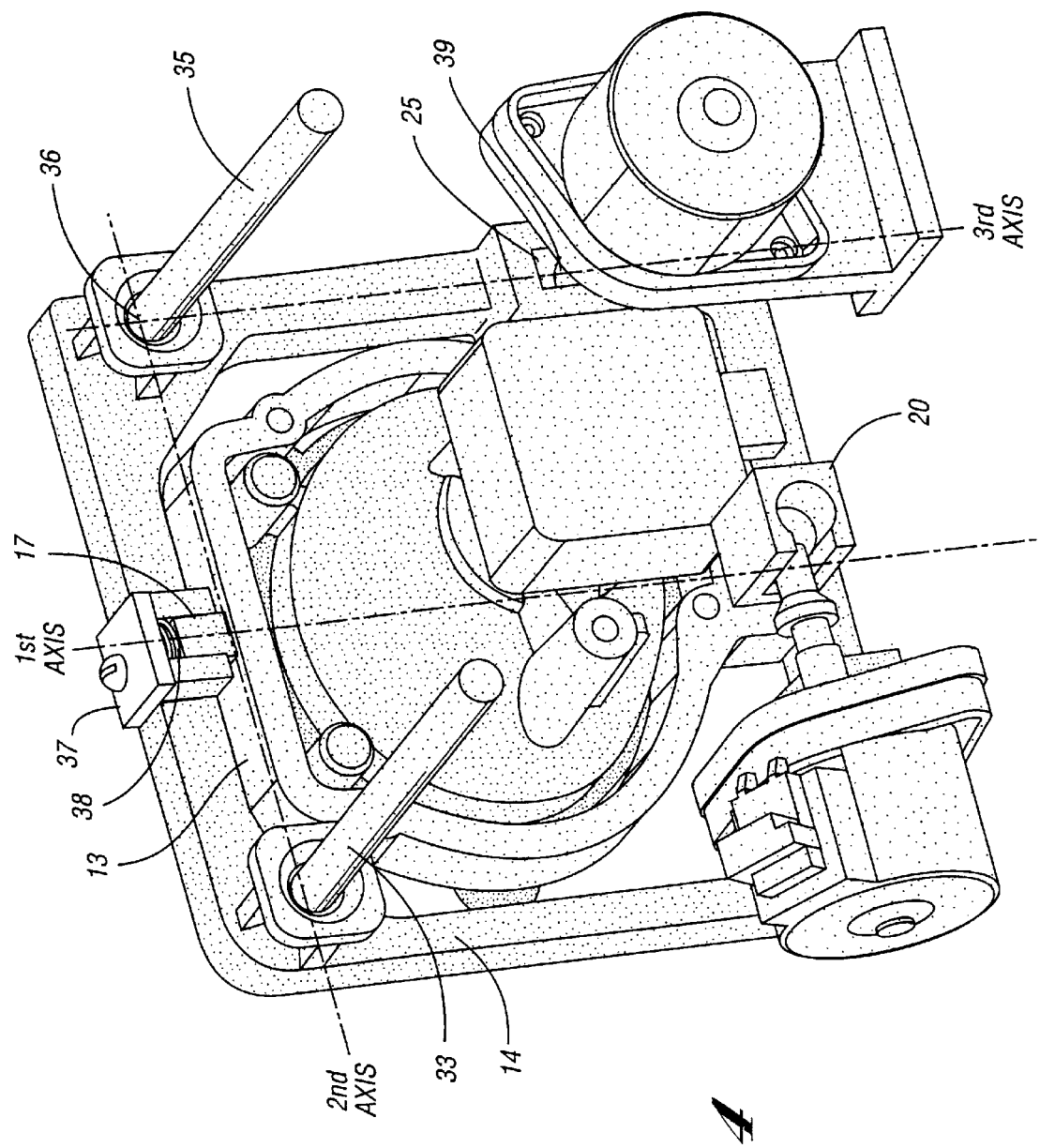
FIG. 4 is a rear view of the apparatus shown in FIG. 1.

FIG. 4 illustrates four axes about which the headlamp body is rotated. The first receiving port 20 cooperates with the first motor assembly for automatic rotation of the headlamp bracket 13 and headlamp body 11 within the outer bracket 14 about the first axis. The second receiving port 25 cooperates with the second motor assembly for automatic rotation of the outer bracket 14 and the headlamp bracket 13 about the second axis.

The first support rod 33 is configured to be manually rotatable so as to translate the first support rod 33 forward or backward. This translation creates horizontal rotation of the outer bracket 14 about a third axis defined by the second receiving port 25 and the arcuate end 36 of the second support rod 35. When both the first support rod 33 and the second support rod 35 are manually rotated so as to translate the first support rod 33 and the second support rod 35 forward or backward, the outer bracket 14 vertically rotates about a fourth axis at the arcuate end 39 of the second motor shaft 31 in the second receiving port 25.

In this embodiment, an end cap 37 is mounted to outer bracket 14 in order to contain a spring 38 between the end cap 37 and the first mounting stem 17. The spring 38 dampens vertical vibrations in the headlamp bracket 13 generated by driving conditions. The end cap 37 may be mounted to the outer bracket 14 by any suitable means, such as screws, clamps or fasteners. In this embodiment, the end cap 37 and outer bracket 14 have threaded apertures through which screws may be disposed to secure the end cap 37 to the outer bracket 14. The end cap 37 is preferably made of the same material as the outer bracket 14 and the headlamp bracket 13.

FIG. 5 illustrates a close-up view of the second motor assembly and its connection to the outer bracket 14. The second motor 30 is mounted to the second motor bracket 32 which in turn is mounted to the housing 12. The second motor shaft 31 is slidably engaged with the second receiving port 25. When the second motor 30 actuates, the outer bracket 14 is pushed upon by the second motor shaft 31 to rotate the outer bracket 14 about the second axis.

For use in one embodiment, the apparatus pivots vertically and/or horizontally based on a vehicle condition, such as vehicle speed, acceleration, turning and other vehicle conditions. This may be accomplished by having a vehicle sensor, e.g., an accelerometer, installed on the vehicle and in communication with an electrical control unit (ECU). The ECU may be in electrical communication with the motors of the apparatus. In one embodiment, the sensor may sense a vehicle acceleration and send a signal indicative of the acceleration to the ECU. From the sensor, the ECU receives the signal and determines power to regulate the motors which actuates the apparatus to pivot the brackets. Thus, the apparatus allows vertical and horizontal movement of the headlamp body based on vehicle conditions, e.g., vehicle turning and/or acceleration, providing improved illumination for night-time driving.

The foregoing discussion and describes the preferred embodiment of the invention. One skilled in the art will readily recognize for such discussion, and from the accompanying drawing and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. Apparatus for swiveling a headlamp body of a vehicle, the apparatus comprising:

a headlamp bracket being configured to receive the headlamp body to rotate the headlamp body, the headlamp bracket having a mounting stem extending therefrom, the headlamp bracket having a first receiving port extending therefrom;

an outer bracket having a receiving slot formed thereon, the receiving slot being shaped so as to receive the mounting stem to define a first axis about which the headlamp bracket rotates within the outer bracket, the outer bracket having a second receiving port extending therefrom, the first receiving port being cooperable with a first motor assembly for rotation of the headlamp bracket within the outer bracket; and a plurality of sockets attached to the outer bracket to define a second axis about which the outer bracket and headlamp bracket rotate, the second receiving port cooperable with a second motor assembly for rotation of the outer bracket and headlamp bracket about the second axis.

2. The apparatus of claim 1, wherein the headlamp body is mounted to the headlamp bracket for rotation of the headlamp body, the first receiving port being engaged with the first motor assembly for rotation of the headlamp bracket and headlamp body about the first axis.

3. The apparatus of claim 2, wherein the first motor assembly includes a first motor and a first motor shaft, the first motor shaft actuated by the first motor and slidably engaged with the first receiving port for rotation of the headlamp bracket about the first axis.

4. The apparatus of claim 1, wherein the headlamp bracket has an outer surface and an inner surface, the mounting stem extending from the outer surface of the headlamp bracket, the outer bracket having a front surface and a back surface, the receiving slot formed on the back surface to receive the mounting stem and being cooperable therewith to allow rotation of the headlamp bracket about the first axis.

5. The apparatus of claim 2, wherein the second motor assembly includes a second motor and a second motor shaft, the second motor shaft actuated by the second motor and slidably engaged with the second receiving port for rotation of the outer bracket and the headlamp bracket about the second axis.

6. The apparatus of claim 1, further comprising a plurality of support rods, each support rod having an arcuate end engaged with one of the sockets for rotation of the outer bracket and headlamp bracket about the second axis, each of the support rods being configured with one of the sockets so as to support the weight of the apparatus.

7. The apparatus of claim 6, wherein the plurality of support rods comprises a first support rod and a second support rod, the first support rod being manually rotatable so as to translate the first support rod forward or backward creating horizontal rotation of the outer bracket about a third axis defined by the second receiving port and the arcuate end of the second support rod.

8. The apparatus of claim 7, wherein the first support rod and the second support rod are manually rotatable so as to translate the first support rod and the second support rod forward or backward creating pivotal movement of the outer bracket about the second receiving port.

9. The apparatus of claim 1, wherein the first motor assembly includes a first motor bracket mounted to the outer bracket for support of a first motor and wherein the second motor assembly includes a second motor bracket mounted to the vehicle for support of a second motor.

10. The apparatus of claim 4, wherein the mounting stem is a first mounting stem, the headlamp bracket having a second mounting stem extending from the outer surface of the headlamp bracket.

11. The apparatus of claim 10, wherein the receiving slot is a first receiving slot, the outer bracket having a second receiving slot formed on the back surface of the outer bracket to receive the second mounting stem and to be cooperable therewith, allowing rotation of the headlamp bracket about the first axis.

12. The apparatus of claim 1, wherein the mounting stem is received in the receiving slot so that the headlamp bracket rotates with the outer bracket about the second axis as the second receiving port cooperates with the second motor assembly.

13. The apparatus of claim 1, wherein the first motor assembly and second motor assembly comprise one multi-motor assembly.

14. Apparatus for swiveling a headlamp body for a vehicle, the apparatus comprising:

a headlamp bracket being configured to receive the headlamp body to rotate the headlamp body, the headlamp bracket having a mounting stem extending therefrom, the headlamp bracket having a first receiving port extending therefrom;

an outer bracket having a receiving slot formed thereon, the receiving slot being shaped so as to receive the mounting stem to define a first axis about which the headlamp bracket rotates within the outer bracket, the outer bracket having a second receiving port extending therefrom, the first receiving port being cooperable with a first motor assembly for rotation of the headlamp bracket within the outer bracket;

a plurality of sockets attached to the outer bracket to define a second axis about which the outer bracket and headlamp bracket rotate, the second receiving port cooperable with a second motor assembly for rotation of the outer bracket and headlamp bracket about the second axis;

the first motor assembly including a first motor and a first motor shaft, the first motor shaft actuated by the first motor and slidably engaged with the first receiving port for rotation of the headlamp bracket about the first axis; and the second motor assembly including a second motor and a second motor shaft, the second motor shaft actuated by the second motor and slidably engaged with the second receiving port for rotation of the outer bracket and the headlamp bracket about the second axis.

15. The apparatus of claim 14, wherein the headlamp body is mounted to the headlamp bracket for rotation of the headlamp body, the first receiving port being engaged with the first motor assembly for rotation of the headlamp bracket and headlamp body about the first axis.

16. The apparatus of claim 14, wherein the headlamp bracket has an outer surface and an inner surface, the mounting stem extending from the outer surface of the headlamp bracket, the outer bracket having a front surface and a back surface, the receiving slot formed on the back surface to receive the mounting stem and being cooperable therewith to allow rotation of the headlamp bracket about the first axis.

17. The apparatus of claim 14, further comprising a plurality of support rods, each support rod having an arcuate end engaged with one of the sockets for rotation of the outer bracket and headlamp bracket about the second axis, each of the support rods being configured with one of the sockets so as to support the weight of the apparatus.

18. The apparatus of claim 17, wherein the plurality of support rods comprises a first support rod and a second support rod, the first support rod being manually rotatable so as to translate the first support rod forward or backward creating horizontal rotation of the outer bracket about a third axis defined by the second receiving port and the arcuate end of the second support rod.

19. The apparatus of claim 18, wherein the first support rod and the second support rod are manually rotatable so as to translate the first support rod and the second support rod forward or backward creating pivotal movement of the outer bracket about the second receiving port.

20. The apparatus of claim 14, wherein the first motor assembly includes a first motor bracket mounted to the outer bracket for support of a first motor and wherein the second motor assembly includes a second motor bracket mounted to the vehicle for support of a second motor.

21. The apparatus of claim 16, wherein the mounting stem is a first mounting stem, the headlamp bracket having a second mounting stem extending from the outer surface of the headlamp bracket.

22. The apparatus of claim 21, wherein the receiving slot is a first receiving slot, the outer bracket having a second receiving slot formed on the back surface of the outer bracket to receive the second mounting stem and to be cooperable therewith, allowing rotation of the headlamp bracket about the first axis.

23. The apparatus of claim 14, wherein the mounting stem is received in the receiving slot so that the headlamp bracket rotates with the outer bracket about the second axis as the second receiving port cooperates with the second motor assembly.

24. The apparatus of claim 14, wherein the first motor assembly and second motor assembly comprise one multi-motor assembly.

25. Apparatus for swiveling a headlamp body for a vehicle, the apparatus comprising:
  a headlamp bracket being configured to receive the headlamp body to rotate the headlamp body, the headlamp bracket having a mounting stem extending therefrom, the headlamp bracket having a first receiving port extending therefrom;
  an outer bracket having a receiving slot formed thereon, the receiving slot being shaped so as to receive the mounting stem to define a first axis about which the headlamp bracket rotates within the outer bracket, the outer bracket having a second receiving port extending therefrom, the first receiving port being cooperable with a first motor assembly for rotation of the headlamp bracket within the outer bracket;
  a plurality of sockets attached to the outer bracket to define a second axis about which the outer bracket and headlamp bracket rotate, the second receiving port cooperable with a second motor assembly for rotation of the outer bracket and headlamp bracket about the second axis;
  the first motor assembly including a first motor and a first motor shaft, the first motor shaft actuated by the first motor and slidably engaged with the first receiving port for rotation of the headlamp bracket about the first axis;
  the second motor assembly including a second motor and a second motor shaft, the second motor shaft actuated by the second motor and slidably engaged with the second receiving port for rotation of the outer bracket and the headlamp bracket about the second axis; and
  a housing having walls defining a cavity, the plurality of support rods being secured to the housing such that the cavity surrounds the outer bracket, the housing with means for mounting to the vehicle body.

26. The apparatus of claim 25, wherein the headlamp body is mounted to the headlamp bracket for rotation of the headlamp body, the first receiving port being engaged with the first motor assembly for rotation of the headlamp bracket and headlamp body about the first axis.

27. The apparatus of claim 25, wherein the headlamp bracket has an outer surface and an inner surface, the mounting stem extending from the outer surface of the headlamp bracket, the outer bracket having a front surface and a back surface, the receiving slot formed on the back surface to receive the mounting stem and being cooperable therewith to allow rotation of the headlamp bracket about the first axis.

28. The apparatus of claim 25, further comprising a plurality of support rods, each support rod having an arcuate engaged with one of the sockets for rotation of the outer bracket and headlamp bracket about the second axis, each of the support rods being configured with one of the sockets so as to support the weight of the apparatus.

29. The apparatus of claim 28, wherein the plurality of support rods comprises a first support rod and a second support rod, the first support rod being manually rotatable so as to translate the first support rod forward or backward creating horizontal rotation of the outer bracket about a third axis defined by the second receiving port and the arcuate end of the second support rod.

30. The apparatus of claim 29, wherein the first support rod and the second support rod are manually rotatable so as to translate the first support rod and the second support rod forward or backward creating pivotal movement of the outer bracket about the second receiving port.

31. The apparatus of claim 25, wherein the first motor assembly includes a first motor bracket mounted to the outer bracket for support of a first motor and wherein the second motor assembly includes a second motor bracket mounted to the vehicle for support of a second motor.

32. The apparatus of claim 27, wherein the mounting stem is a first mounting stem, the headlamp bracket having a second mounting stem extending from the outer surface of the headlamp bracket.

33. The apparatus of claim 32, wherein the receiving slot is a first receiving slot, the outer bracket having a second receiving slot formed on the back surface of the outer bracket to receive the second mounting stem and to be cooperable therewith, allowing rotation of the headlamp bracket about the first axis.

34. The apparatus of claim 25, wherein the mounting stem is received in the receiving slot so that the headlamp bracket rotates with the outer bracket about the second axis as the second receiving port cooperates with the second motor assembly.

35. The apparatus of claim 25, wherein the first motor assembly and second motor assembly comprise one multi-motor assembly.

* * * * *